(12) United States Patent
Tsai

(10) Patent No.: US 7,187,544 B2
(45) Date of Patent: Mar. 6, 2007

(54) POWER OUTPUT DEVICE OF A COMPUTER POWER SUPPLY

(76) Inventor: Tsung Yen Tsai, 235 Chung-Ho Box 8-24, Taipei (TW)

(*) Notice: Subject to any disclaimer, the term of this patent is extended or adjusted under 35 U.S.C. 154(b) by 272 days.

(21) Appl. No.: 11/006,225

(22) Filed: Dec. 7, 2004

(65) Prior Publication Data

US 2006/0104099 A1    May 18, 2006

(30) Foreign Application Priority Data

Nov. 12, 2004   (TW) .............................. 93218170 U

(51) Int. Cl.
*H05K 5/00* (2006.01)
*H02M 1/00* (2006.01)
*H01R 13/60* (2006.01)

(52) U.S. Cl. ...................... 361/686; 361/683; 363/144

(58) Field of Classification Search ................ 363/144, 363/147; 361/683, 686, 728, 730, 736, 748, 361/752, 760, 761; 439/218, 222, 527, 529, 439/530, 533, 535, 536, 540.1

See application file for complete search history.

(56) References Cited

U.S. PATENT DOCUMENTS

| 5,243,493 A * | 9/1993 | Jeng et al. ................... 361/690 |
| 6,304,437 B1 * | 10/2001 | Foo et al. .................... 361/683 |
| 6,735,078 B2 * | 5/2004 | Tsai ............................ 361/695 |
| 6,822,861 B2 * | 11/2004 | Meir ........................... 361/695 |
| 6,935,902 B1 * | 8/2005 | Chou .......................... 439/701 |

* cited by examiner

*Primary Examiner*—Matthew V. Nguyen

(57) ABSTRACT

A power output device of the present invention comprises a power supply having an input end for conducting electric current and an output device for supplying power to a computer. The output device has the following elements. A main cable and a sub-cable are connected to a bus on a circuit board of the power supply. An external module is formed by a substrate, a plurality of receptacles and at least one conductive wire. The substrate is connected to the power output bus of the circuit board through a bank of wires. The receptacles are positioned on the substrate and pass out of a back plate of the power supply; each receptacle being electrically connected to the printed circuits of the substrate. One end of the conductive wire has a joint for being received by the receptacle; another end of the conductive wire having a plug as a power supply end.

4 Claims, 4 Drawing Sheets

POWER OUTPUT DEVICE OF A COMPUTER POWER SUPPLY

FIELD OF THE INVENTION

The present invention relates to power supplies, and in particular a power output device of a computer power supply, wherein the output wires of the power supply are arranged in order and the wire connection is improved. As a result the airflow within a computer casing is also improved so as to have a preferred heat dissipation effect.

BACKGROUND OF THE INVENTION

In the prior art, the personal computer includes a mainframe, a central processing unit (CPU), interface cards, and data accessing units (such as, a hard disk, a compact disk driver, a card reader), etc. All these need power supply for supplying power to the electronic devices.

Referring to FIG. 1 a prior art power supply 1 is illustrated. The power supply 1 has an output wire set 11. The output wire set 11 includes a main cable 12, a sub-cable 13 and a plurality of auxiliary wires 14 for supplying power to the mainframe and central processing unit, and interface cards. A plurality of plugs 15 are connected to the auxiliary wires 14 for supplying power to data processing units, etc. However in the prior art, the cables and wires are arranged disorderly. Moreover, the computer casing is smaller and smaller, the wires and cables in the casing will interfere the airflow so that the heat dissipation in the casing is not preferred.

SUMMARY OF THE INVENTION

Accordingly, the primary object of the present invention is to a power output device of a computer power supply, wherein the output wires of the power supply are arranged in order and the wire connection is improved. As a result the airflow within a computer casing is also improved so as to have a preferred heat dissipation effect.

To achieve above objects, the present invention provides a power output device of the present invention which comprises a power supply having an input end for conducting electric current and an output device for supplying power to a computer. The output device has the following elements. A main cable and a sub-cable are connected to a bus on a circuit board of the power supply. An external module is formed by a substrate, a plurality of receptacles and at least one conductive wire. The substrate is connected to the power output bus of the circuit board through a bank of wires. The receptacles are positioned on the substrate and pass out of a back plate of the power supply; each receptacle being electrically connected to the printed circuits of the substrate. One end of the conductive wire has a joint for being received by the receptacle; another end of the conductive wire having a plug as a power supply end.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
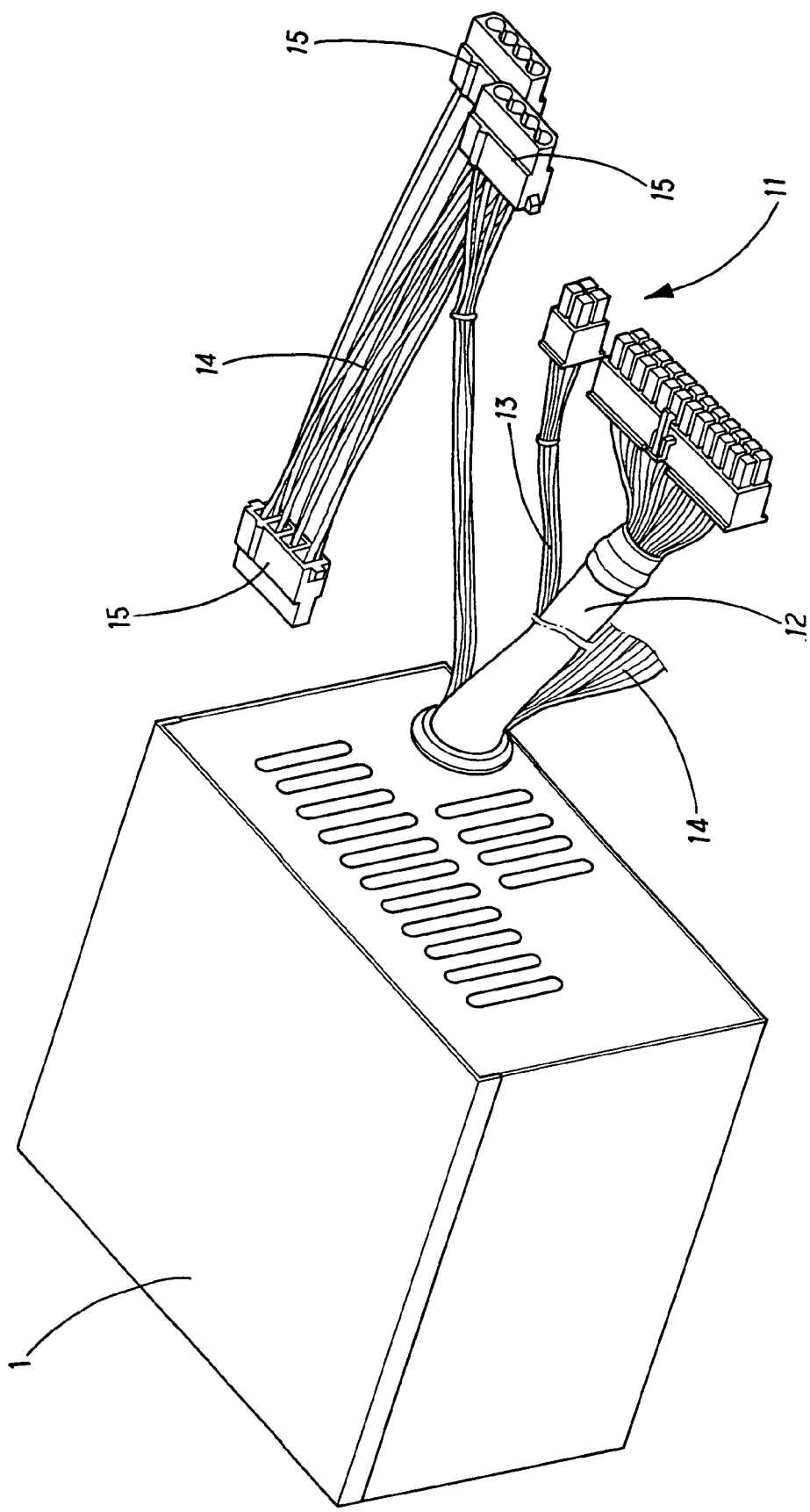
FIG. 1 is a perspective view of a prior art power supply.
Figure 2:
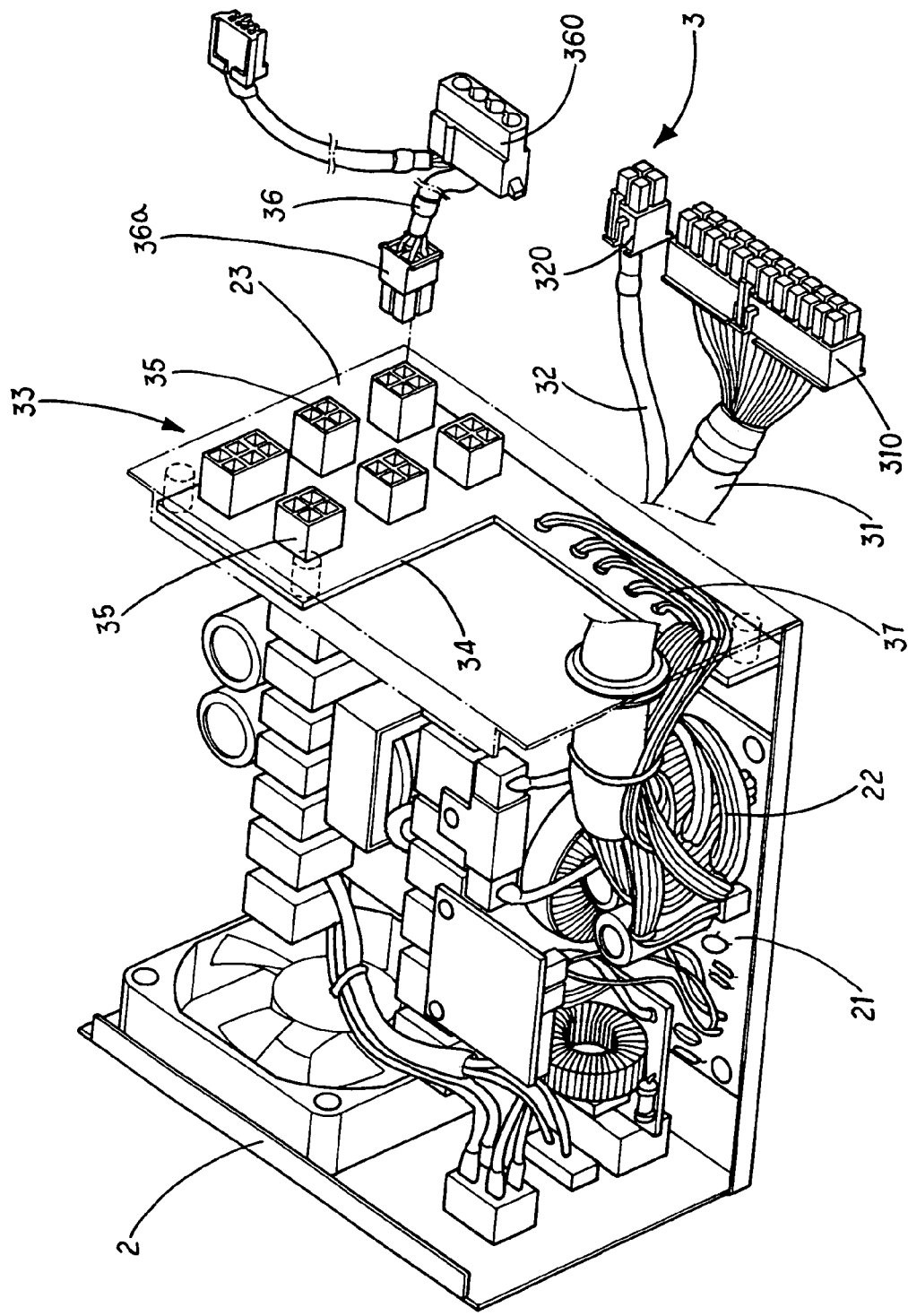
FIG. 2 is a structural perspective view of the present invention.
Figure 3:
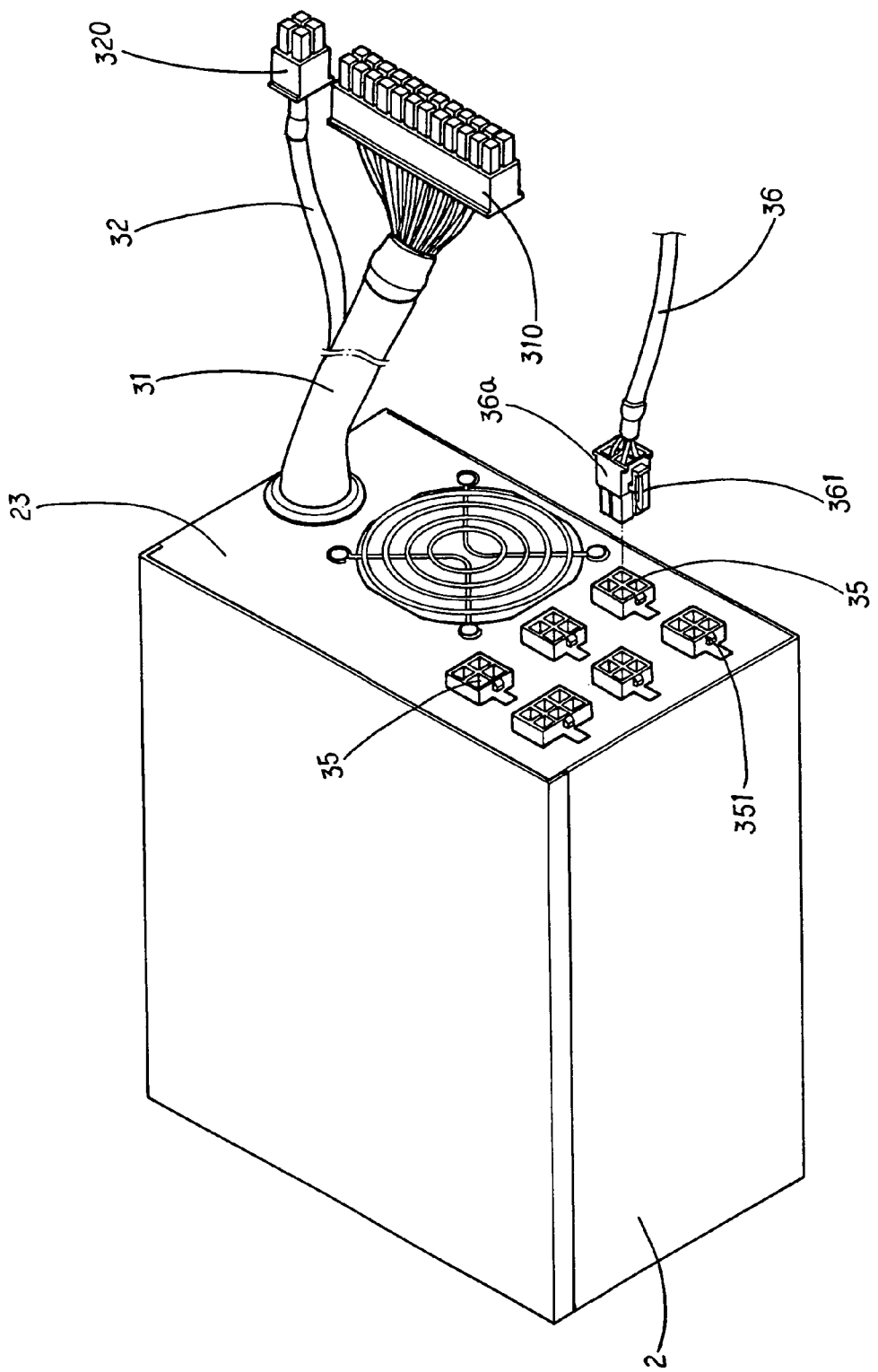
FIG. 3 is an assembled schematic view showing the assembly of the buckle ear and the block of the present invention.

Referring to FIGS. 2 and 3, the structure of the power output device of a computer power supply of the present invention is illustrated. The power output device of the present invention has the following elements.

A power supply 2 has an input end for conducting electric current and an output device 3 for supplying power to a computer.

The output device 3 has the following elements.

A main cable 31 is connected to a bus 22 on a circuit board 21 of the power supply 2. The main cable 31 has a plug 310 with 20 or 24 pins for supplying power (in the drawing, a 24 pin plug is used as an example, but this is not used to confine the scope of the present invention).

A sub-cable 32 is also connected to the bus 22 of the circuit board 21 of the power supply 2. The sub-cable 32 has a plug 320 of 4 pins for supplying power.

Figure 4:
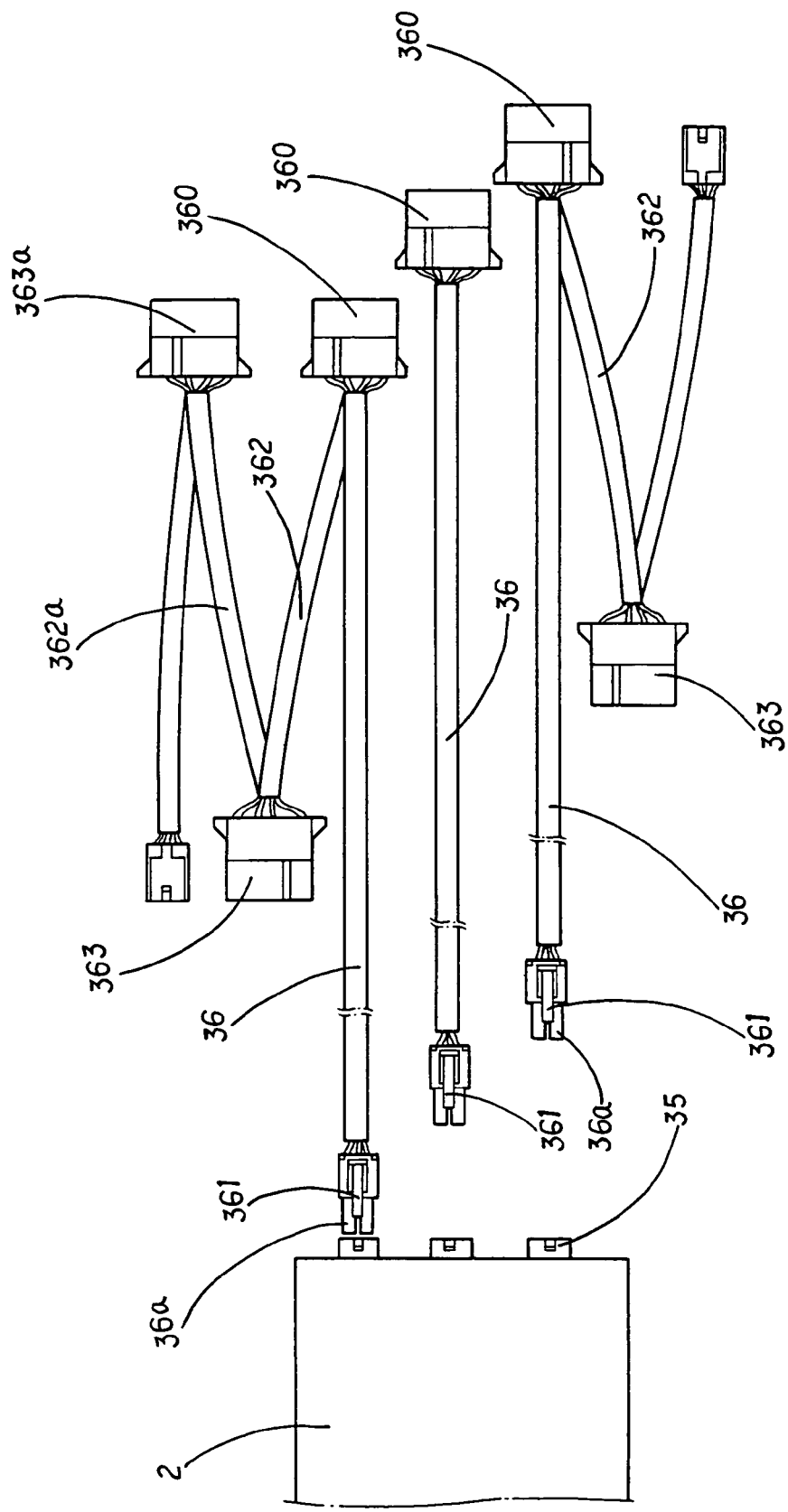
FIG. 4 shows a view of the conductive wire according to the present invention.

An external module 33 is formed by a substrate 34, a plurality of receptacle 35 and at least one conductive wire 36. The substrate 34 has printed circuits thereon. The substrate 34 is connected to the power output bus 22 of the circuit board 21 through a bank of wires 37 so as to supply power. The receptacles 35 are positioned on the substrate 34 and pass out of a back plate 23 of the power supply 2. One side of each receptacle 35 has a block 351. Each receptacle 35 is electrically connected to the printed circuits of the substrate 34. Power output of each receptacle 35 is independent to each other. One end of the conductive wire 36 has a joint 36a for being received by the receptacle 35. The joint 36a has a buckle ear 361. The conductive wire 36 can be received into the receptacle 35 as the buckle ear 361 is pressed. Another end of the conductive wire 36 is a plug 360 as a power supply end. In use, other than using single one plug 360, the conductive wire 36 can be connected to the sub-conductive wire 362, 362a in parallel by using the plugs 363, 363a as power supply end (referring to FIG. 4). Thereby one conductive wire 36 can provide at least two plugs, 360, 363, and 363a as power supply ends so as to be connected to data access units or other devices.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. A power output device comprising:
   a power supply having an input end for conducting electric current and an output device for supplying power to a computer;
   the output device having the following elements;

a main cable connected to a bus on a circuit board of the power supply; the main cable having a plug with 20 or 24 pins for supplying power;

a sub-cable connected to the bus of the circuit board of the power supply; the sub-cable having a plug of 4 pins for supplying power;

an external module being formed by a substrate, a plurality of receptacles and at least one conductive wire; the substrate having printed circuits; the substrate being connected to the power output bus of the circuit board through a bank wire so as to supply power; the receptacles being positioned on the substrate and passing out of a back plate of the power supply; each receptacle being electrically connected to the printed circuits of the substrate; power output of each receptacle being independent to each other; one end of the conductive wire having a joint for being received by the receptacle; another end of the conductive wire having a plug as a power supply end.

2. The power output device of a computer power supply as claimed in claim 1, wherein one side of each receptacle having a block; the joint having a buckle ear; the conductive wire can be received into the receptacle as the buckle ear is pressed.

3. The power output device of a computer power supply as claimed in claim 1, wherein a second conductive wire is extended from the plug connected to the conductive plug and one end of the second conductive wire is connected to a second plug as a power supply end, other conductive wire can be further connected to the second plug; the structure is repeated so that a plurality of conductive wires are connected to provide more power supply ends.

4. The power output device of a computer power supply as claimed in claim 2, wherein a second conductive wire is extended from the plug connected to the conductive plug and one end of the second conductive wire is connected to a second plug as a power supply end, other conductive wire can be further connected to the second plug; the structure is repeated so that a plurality of conductive wires are connected to provide more power supply ends.

* * * * *